J. A. BOYER.
Refrigerator Building.
No. 57,670. Patented Sept. 4, 1866.
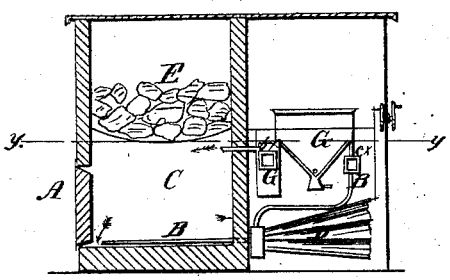
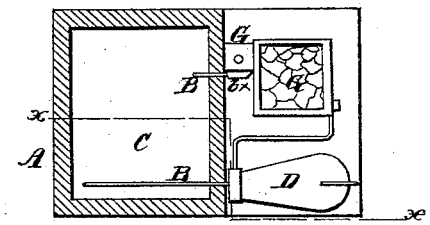
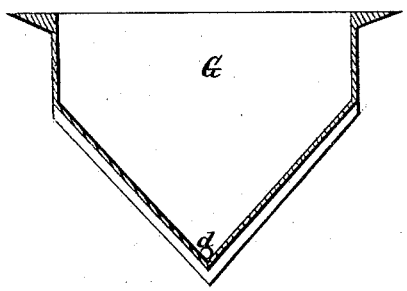
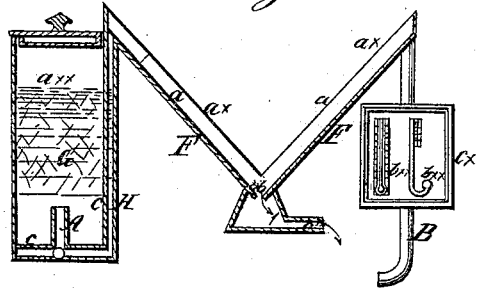
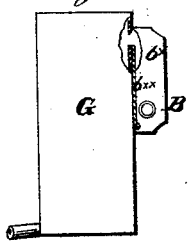
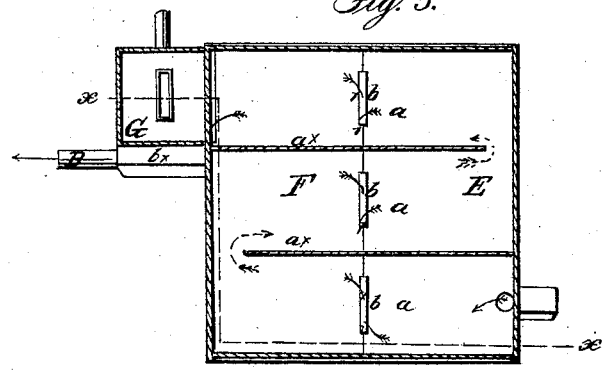
Witnesses:
M. Ahearne Jr.
Theo. Dusch.
Inventor:
J. A. Boyer
per Munn & Co.
Attorneys
AM. PHOTO-LITHO. CO. N.Y. (OSBORNE'S PROCESS.)

UNITED STATES PATENT OFFICE.

JAMES A. BOYER, OF GREENSBURG, INDIANA.

IMPROVEMENT IN REFRIGERATOR-BUILDINGS FOR PRESERVING FRUIT, &c.

Specification forming part of Letters Patent No. 57,670, dated September 4, 1866.

*To all whom it may concern:*

Be it known that I, JAMES A. BOYER, of Greensburg, county of Decatur, and State of Indiana, have invented a new and Improved Refrigerator for Preserving Vegetables, Meats, &c; and I do hereby declare that the following is a full, clear, and exact description thereof, which will enable others skilled in the art to make and use the same, reference being had to the accompanying drawings, forming part of this specification, in which—

Figure 1 is a vertical section of my invention, taken in the line $x\,x$, Fig. 2; Fig. 2, a horizontal section of the same, taken in the line $y\,y$, Fig. 1; Fig. 3, an enlarged vertical section of the ice-chamber pertaining to the same; Fig. 4, an enlarged vertical section of the sinuous duct underneath the ice-chamber, taken in the line $z\,z$, Fig. 5; Fig. 5, a plan or top view of Fig. 4; Fig. 6, a detached side view of the absorbing-chamber.

Similar letters of reference indicate like parts.

This invention relates to certain new and useful improvements in refrigerators for preserving vegetables, meats, &c.; and it consists in a novel means for creating or inducing a current of air through the refrigerator, and also in a novel arrangement of means for cooling the air and depriving it of moisture, and, further, by the application of a thermometer and barometer to the air-duct, whereby the condition of the air within the refrigerator may always be well known and kept in a proper state.

A represents a building or structure which is provided with double walls and filled in with any suitable non-conducting material, as usual, and B is a pipe which leads from the lower part of the interior of the preserving-compartment C of A, and is connected with a bellows, D, at the exterior of A, and passes up and enters A at its upper part, just underneath an ice-compartment, E, which is above C, as shown clearly in Fig. 1. By operating the bellows D the air will be drawn from the lower part of C and forced into its upper part, the current being indicated by the red arrows, as shown in Fig. 1. By this arrangement the air within the chamber is kept at a uniform temperature throughout, for cold air is forced into the upper part of C, and the ice-compartment E, above C, in connection with the cold air admitted into the upper part of C, counteracts a warm temperature at the upper part of the preserving-chamber, which would otherwise occur on account of warm air naturally ascending.

The air, when drawn from the lower part of the preserving-chamber C, is reduced in temperature and dried as follows: The pipe B communicates with a serpentine duct or series of ducts, $a$, or air-passages formed by having cleats $a^x$ attached to the two inclined plates F F, placed or arranged in V form. (See Figs. 4 and 5.) The direction of the air through these ducts is indicated by the red arrows in Fig. 5, and directly over the plates F F an ice-chamber, G, is placed, having a double-inclined or V-shaped bottom, corresponding to the inclination of the plates F F, as shown in Figs. 3 and 4. By this means it will be seen that the air in passing through the sinuous ducts $a$ will be brought in contact with a large cooling-surface, and consequently reduced in temperature, and apertures $b$ are made in the lower parts or angles of the ducts $a$, to allow the water of condensation to escape through pipes $c$, as indicated by the black arrows 1 in Figs. 4 and 5. The waste water from the ice is allowed to escape through a pipe, $d$, at one side of the lower part of G. (See Fig. 3.)

G represents a chamber adjoining the cooling or condensing device or apparatus just described. This chamber may be provided with any material or substance, $a^{xx}$, which will absorb moisture, a passage, H, being arranged, by means of partitions $e$, within the chamber G, so as to cause the air to pass downward and then upward through the absorbing material, as shown in Fig. 4.

The pipe B passes from a box, $b^x$, at the side of G, in which box a thermometer and barometer, $b^{xx}$, are placed, for the purpose of indicating the condition of the air passing into C, the box $b^x$ of course communicating with G above the absorbing material $a^{xx}$. A similar box, $c^x$, containing a thermometer and barometer, is connected with pipe B, just before it enters the sinuous ducts $a$, in order to indicate the condition of the air before being cooled and dried.

I claim as new and desire to secure by Letters Patent—

1. The combination and arrangement of the pipes B B, situated one in the lower, the other in the upper, part of the chamber C, the bellows D, or its equivalent, situated as described, and the series of V-shaped air-passages under the ice-chambers, so that the air will be drawn from the lower part of the chamber, cooled by the condenser, and forced into the upper part of said chamber, substantially as described.

2. In combination with the above parts, the absorbing-chamber G, constructed and operating as described.

3. The construction and arrangement of the cooling or condensing apparatus as shown, to wit: having a series of ducts or air-passages, $a\ a$, inclined in V form, and placed underneath the ice-chamber having a V-shaped bottom, the whole being constructed and operating substantially in the manner and for the purpose set forth.

4. The arrangement of the absorbing-chamber as shown, to wit: having said chamber provided with a partition-plate, $e$, and pipe H, constructed and operating substantially as described.

5. In combination with the pipes B B or chambers $b^\times\ c^\times$, connected therewith, for ingress and egress of the air, a thermometer and barometer, for the purposes described.

JAMES A. BOYER.

Witnesses:
M. M. LIVINGSTON,
C. L. E. TOPLIFF.